United States Patent
Herrmann

(10) Patent No.: US 12,182,491 B2
(45) Date of Patent: Dec. 31, 2024

(54) SIGN BUNDLE ORGANIZATION USING AREAS

(71) Applicant: Xerox Corporation, Norwalk, CT (US)

(72) Inventor: Douglas K. Herrmann, Webster, NY (US)

(73) Assignee: Xerox Corporation, Norwalk, CT (US)

(*) Notice: Subject to any disclaimer, the term of this patent is extended or adjusted under 35 U.S.C. 154(b) by 236 days.

(21) Appl. No.: 17/822,574

(22) Filed: Aug. 26, 2022

(65) Prior Publication Data
US 2024/0070374 A1    Feb. 29, 2024

(51) Int. Cl.
*G06F 40/106*    (2020.01)

(52) U.S. Cl.
CPC ................. *G06F 40/106* (2020.01)

(58) Field of Classification Search
CPC .................................................... G06F 40/106
See application file for complete search history.

(56) References Cited

U.S. PATENT DOCUMENTS

| | | | |
|---|---|---|---|
| 6,897,763 B2 | 5/2005 | Schulmerich et al. | |
| 7,426,798 B2 | 9/2008 | Koomen et al. | |
| 9,376,286 B1* | 6/2016 | Browning | B65G 57/04 |
| 9,924,810 B2 | 3/2018 | Vieville | |
| 10,002,344 B2 | 6/2018 | Wu et al. | |
| 10,373,116 B2 | 8/2019 | Medina et al. | |
| 2008/0010169 A1* | 1/2008 | Dollens | G06Q 30/0603 705/27.2 |
| 2010/0121663 A1 | 5/2010 | Valeriano | |
| 2018/0107968 A1* | 4/2018 | Wu | G06T 11/60 |

* cited by examiner

*Primary Examiner* — Cao H Nguyen
(74) *Attorney, Agent, or Firm* — Gibb IP Law Firm, LLC

(57) ABSTRACT

Methods and systems obtain, using a computer, a space layout having areas. The areas maintain display structures, and the display structures are adapted to maintain display items. Such methods and systems obtain, using the computer, item data related to the display items. The item data is formatted to be printed on item signs that are adapted to be attached to the display structures in locations corresponding to the display items. Each of the item signs is different from the other item signs and each of the item signs is specific to the corresponding display items. These methods and systems: determine, using the computer, for each of the areas, an area-specific number of item signs to be printed based on the display items in each of the areas; obtain, using the computer, bundle rules; and organize, using the computer, the item signs into sign bundles according to the bundle rules.

18 Claims, 11 Drawing Sheets

FIG. 7

SIGN BUNDLE ORGANIZATION USING AREAS

BACKGROUND

Systems and methods herein generally relate to signs attached to display structures maintaining display items and more particularly to systems and methods that produce and bundle the signs in a manner to facilitate the most efficient installation of the signs on the display items within a given layout.

Signage within retail environments, warehouses, tradeshows, corporate locations, etc., is very useful to provide information and guide individuals operating within physical spaces. Such signage can have a limited useful life and often needs to be periodically replaced. While electronic signs are useful for performing quick price changes, printed signs can be less expensive and more readable when compared to electronic signs. Within some environments, a centralized printing facility prepares new signs that are sent in bundles to various locations that need replacement signage.

At the locations, these bundles are unpacked, and some (or all) of the existing signage is replaced with new signs, often manually by employees. Inefficient allotment of signs within bundles can waste resources during the periodic replacement of signs. Inefficiencies are also seen within centralized sign production facilities which can result in excess material usage, unnecessary waste, lost production time, etc.

SUMMARY

Various methods herein obtain, using a computer, a space layout having areas that maintain display structures. The areas are each a continuous, unbroken geometric shape within the space layout. The areas generally do not overlap one another within the space layout. The display structures are adapted to maintain display items. Also, these methods obtain, again using the computer, item data related to the display items. Such display items can be, for example, marketing material, warehoused items, merchandise that is for sale, etc., and the item data can include prices for, and descriptions of, such items. The item data is formatted to be printed on item signs that are adapted to be attached to the display structures in locations corresponding to the display items. Each of the item signs is different from the other item signs and each of the item signs is specific to the corresponding display items.

Further, these methods determine, using the computer, for each of the areas, an area-specific number of item signs that need to be printed and this is based on the display items in each of the areas. Additionally, such methods obtain, using the computer, bundle rules. In some examples, bundle rules can include size limits for sign bundles, sequential order constraints for individual printed signs within the sign bundles, the size of the print media, the number of the item signs to be printed on each of the sheets of the print media, etc. The display structures are often arranged in aisles and the bundle rules can require that signs for multiple aisles be included in each bundle. Further, the bundle rules can, for example, avoid including a partial aisle in a sign bundle.

This allows these methods to organize, using the computer, the item signs into the sign bundles according to the bundle rules. In some options herein, the methods adjust, using the computer, the sizes of the areas within the space layout to optimize the number of signs in each of the sign bundles. The process of adjusting the areas within the space layout can be based at least partially on user feedback. Such processing can repeat, using the computer, the organizing of the item signs into the sign bundles after adjusting the areas.

Once the bundles are established, these methods print, using a printer device that is controlled by the computer, the item signs. Also, such processing can print labels identifying subsequent printed signs in a bundle. In such processing, multiple item signs are printed on each sheet of print media. This processing can also: cut, using a cutter device controlled by the computer, the print media into individual printed signs; stack, using a stacker device controlled by the computer, the printed signs into the sign bundles; and wrap, using a wrapper device controlled by the computer, the sign bundles.

Various systems herein include at least one computer or computer system that is adapted to obtain a space layout having areas. The areas are each a continuous, unbroken geometric shape within the space layout. The areas generally do not overlap one another within the space layout. The display structures are adapted to maintain display items. Such display items can be, for example, marketing material, warehoused items, merchandise that is for sale and the item data can includes prices for, and descriptions of, such items. The computer is adapted to obtain item data related to the display items. The item data is formatted to be printed on item signs and the item signs are adapted to be attached to the display structures in locations corresponding to the display items. Each of the item signs is different from the other item signs and each of the item signs is specific to the corresponding display items.

The computer is also adapted to determine, for each of the areas, an area-specific number of item signs to be printed based on the display items in each of the areas. Additionally, the computer is adapted to obtain bundle rules. In some examples, the bundle rules can include size limits for sign bundles, sequential order constraints for individual printed signs within the sign bundles, the size of the print media, the number of the item signs to be printed on each of the sheets of the print media, etc. The display structures are often arranged in aisles and the bundle rules can include a need for each bundle to include items signs for multiple aisles. Further, the bundle rules can also avoid including a partial aisle in a sign bundle.

Also, the computer is adapted to organize the item signs into the sign bundles according to the bundle rules. Additionally, the computer is adapted to adjust the sizes of the areas within the space layout to optimize the number of signs in each of the sign bundles. The computer also is adapted to repeat the processes of organizing the item signs into the sign bundles after adjusting the areas.

These systems also include at least one printer device that is controlled by the computer. The printer device is adapted to print the item signs and labels identifying subsequent printed signs in a bundle. Multiple item signs are printed on each sheet of print media. Such systems also include a cutter device that is controlled by the computer. The cutter device is adapted to cut the print media into individual printed signs. These systems additionally include a stacker device that is controlled by the computer. The stacker device is adapted to stack the printed signs into the sign bundles. The systems herein also include a wrapper device that is controlled by the computer. The wrapper device is adapted to wrap the sign bundles.

These and other features are described in, or are apparent from, the following detailed description.

BRIEF DESCRIPTION OF THE DRAWINGS

Various exemplary systems and methods are described in detail below, with reference to the attached drawings, in which:

FIG. 7 is a conceptual schematic diagram of signs printed on a sheet;

DETAILED DESCRIPTION

Figure 1:
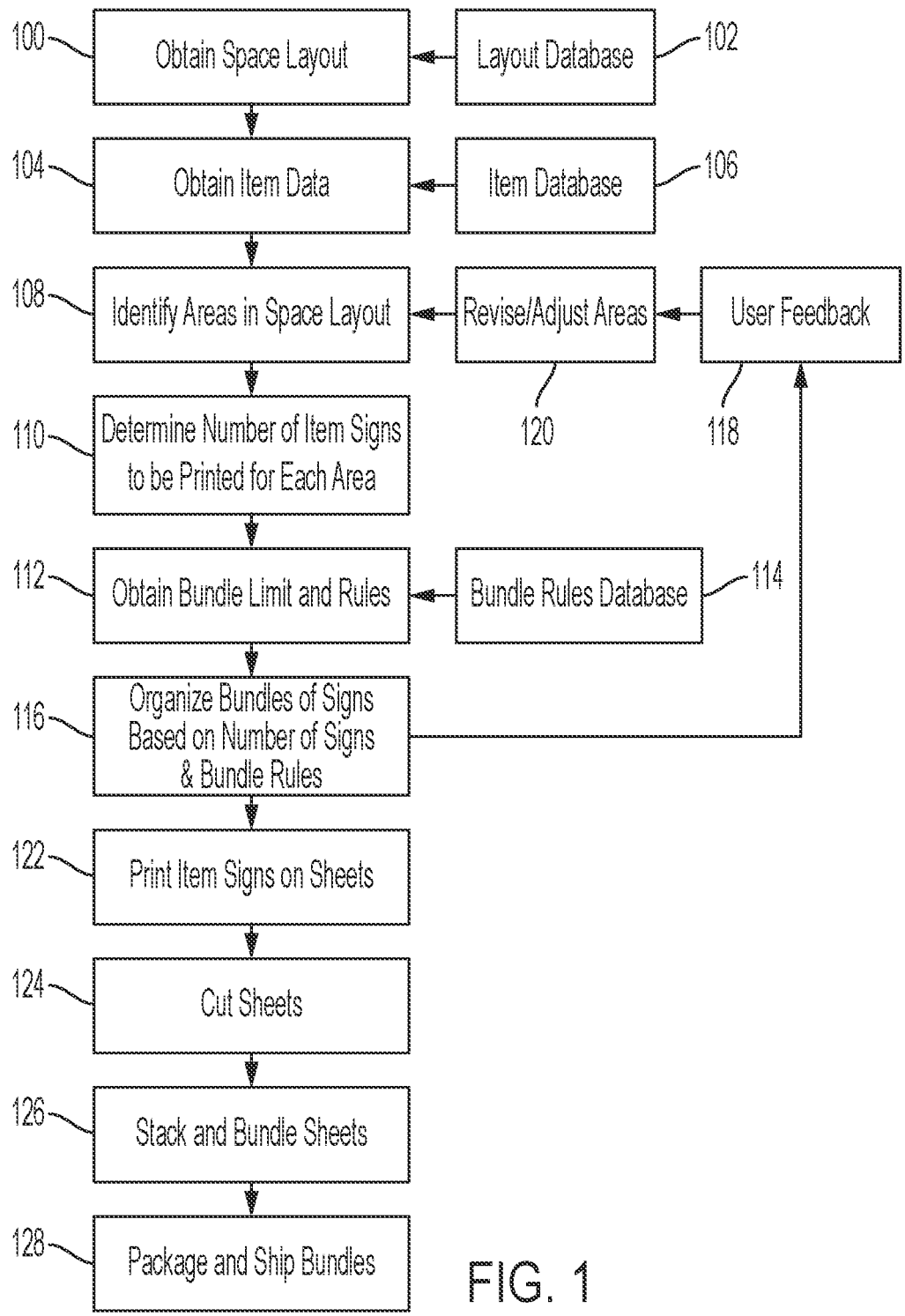
FIG. 1 is a flow diagram of various methods and systems herein.

As mentioned above, inefficiencies can exist within signage systems, such as within sign printing and sign installation. In one example of printed replacement signs shipped to a retail environment, banded stacks of signs are unpacked by employees and brought to each aisle for application to the shelves. To apply the signs, the bundles are un-banded, and the printed signs are adhered to the shelving. During such operations, all blank signs within the bundles need to be removed, held, and then discarded.

Many locations rely on an aisle order sort, requiring bundles of signs to be assigned on an aisle-by-aisle basis (one bundle per aisle). This can increase the number of pitches that are skipped. For example, when the finishing/banding systems need more time than the printer takes to print the sheets, the printer will skip printing a sheet to allow the finishing components to complete their operations (i.e., cutting, collating, banding/wrapping, etc.). In addition to skipped pitches, when printing an aisle with less than the number of signs per sheet (i.e., only printing 1 sign on a 12-up sheet, with 11 blank signs) this results in more blank signs per bundle. Blank/wasted signs occur when, for example, printing is imposed in a 12-up manner and the sign count per aisle differs from the 12 multiple. Skipped pitches and the extra blanks impacts shipping, time to produce the signs for all stores per week, etc., and leads to a lot of scrap. Additionally, when each bundle is limited to a single aisle, employees must unbundle each aisle separately and remove all the blanks before/while putting up the signs.

The systems and methods disclosed herein address such issues by providing processing that evaluates the location planogram (physical space layout) and then reduces the number of bundles by using an optimized and predesignated bundle per area, rather than bundling by aisle.

With processing herein, each area within a given space layout can be defined by department, the areas can span only a part of a department, or the areas can span multiple departments. In this way the stack/bundle count is optimized and maintained below a maximum. Also, with systems and methods herein, the area sort can be adjusted to accommodate differing sign counts for different retail or warehouse locations, different quantities can be based on season/week or other location, region, or sale specific quantities. Further, the system and methods herein take the area sort imposition and uses this to time the sheets and calculate how many sheets are needed to fulfil the area stack. Thus, with the systems herein, cut signs are collated until the number of signs for the area has been met and the signs are stacked and banded by a designated area sort. These methods address the issues with sign production in order to reduce cycles on the system, reduce banding material, reduce the weekly production schedule (skipped pitches), and reduce wasted signs ( ) to allow for faster turnaround of each production run.

Therefore, the systems and methods herein print and bundle signs according to pre-determined spatial areas (i.e., a department or across departments based on each individual location layout). In contrast if replacement signs are simply bundled based on a maximum bundle sizing, when installing the replacements signage at the location, the bundles must be broken down and re-bundled by area for the employees to bring the signs to the areas, which can take several hours per location per week. Similarly, if a limit of one bundle per aisle is imposed, employees must un-band each aisle and discard large amounts of blank signs. Both such issues are addressed by the processing herein that bundles signs by pre-designated areas, which allows bundles to be created for each area of the space layout without requiring sorting at the installation location. Systems and methods herein produce bundles that include signs for more than just one aisle, allowing a significant reduction in blanks.

Because each space layout can be different and because the sign content and count changes by region and space layout, the systems and methods herein define the aisles within an area for optimum productivity. Each space layout identifies an appropriate grouping that includes one or more departments, allowing systems herein to print and bundle the signs to meet the individual space layout requirements. Additionally, processing herein can add or remove incremental aisles within the areas to allow for even finer optimization of sign count.

Conceptually, the systems herein include an Area Order Sort (AOS) shelf planner that determines print/cutting and banding to allow adaptation to irregular and variable space planograms and to maximize the portion of printed signs within delivered bundles of signs. Such processing provides systems for optimizing media usage (printed signs) and aligning the multi-aisle sign bundle delivery to best match the non-uniform physical layouts. These systems combine multiple aisles into single area and the sorted bundles are provided in aisle order based on each locations physical layout. Additionally, the aisle/area sorting can be optimized in relation to the number of possible signs on a sheet i.e., 12-up, 18-up etc. As multiple aisles could be contained within a stack, an individual aisle indicator can be included to let the operator know a new aisle has been started.

These systems and methods also address the non-trivial problem of aligning multiple aisles within a bundle to match the unique and special displays within the space layouts, and the problems of matching manufactured printed bundles to align with non-uniform aisles such as end caps, right angle aisles, wall aisles, special displays, intra-aisle displays, and seasonal item displays. The processing herein further provides systems for matching physical layouts to programmed print and finishing imposition processes. Additionally, the systems and methods herein optimize media usage by varying aisle area sort bundles based on sign count and per week flexibility in the aisles composing the bundle. By allowing variability in aisles included in bundles, the system is further optimized to take advantage of the multi-up media and sign multiples.

Thus, the systems and methods herein reduce the skip pitch requirements, which significantly improves productivity of the system by reducing single aisle low sign count aisles. This reduces production days and delivery time to the locations. Additionally, this processing significantly reduces blank signs associated with low sign count bundles and reduces the percentage of signs not printed (blanks). Such improves employees experience by reducing the number of blanks to be handled, reducing the number of bundles to be un-banded, allowing for more aisle to be done at one time.

FIG. 1 is flowchart illustrating exemplary methods herein. In item 100, these methods obtain, using a computer, a space layout. The space layout can be obtained, for example, from a layout database 102. In other options, the space layout can be manually entered into the computer system by a user through the various user interface devices or the user may supply a file to the computer that contains the space layout.

Figure 2:
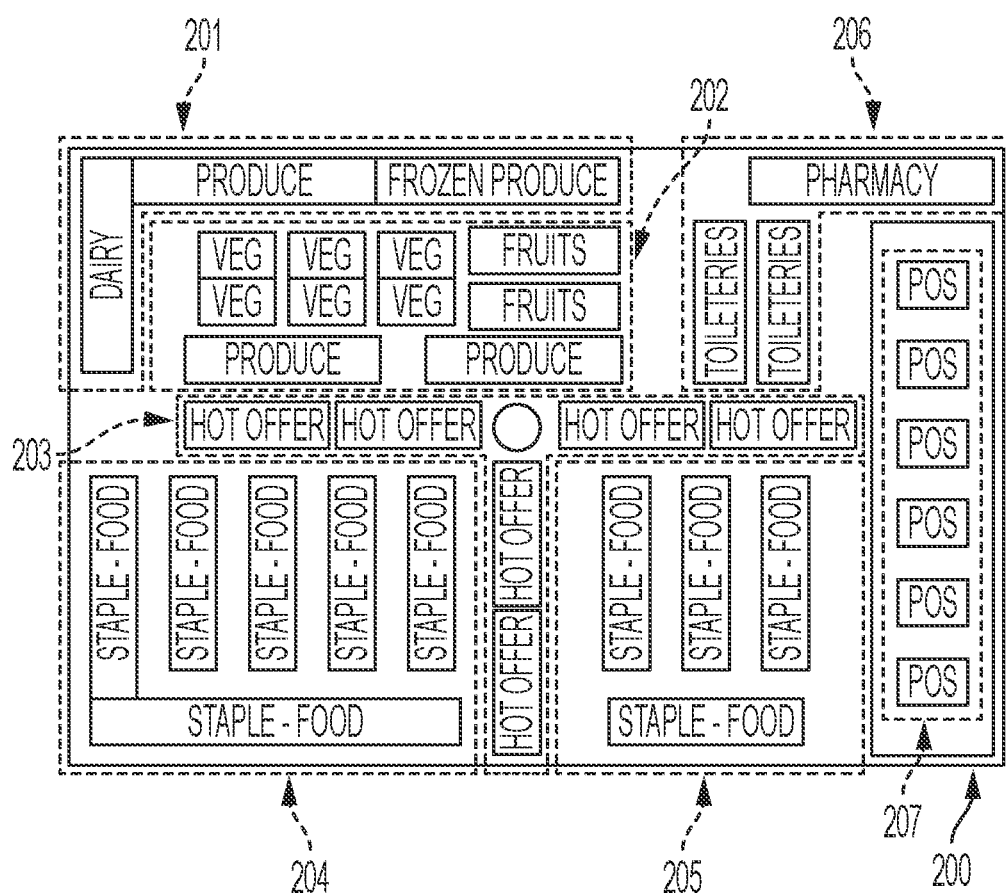
FIGS. 2-6 are conceptual schematic diagrams of space layouts processed by methods and systems herein.

Referring briefly to FIG. 2, item 200 is an exemplary space layout for a retail environment, warehouse, or similar physical location. As can be seen in FIG. 2, the space layout 200 has various areas 201-207 that maintain display structures (e.g., shelving, refrigeration/freezer units, assigned floor space, etc.) for different items such as dairy, fresh produce, frozen produce, vegetables, fruits, pharmacy items, toiletries, staple foods, and promotional items ("hot offers"). In this example, area 201 includes display structures positioned along a wall of the space layout 200 for dairy, produce, and frozen produce; area 202 includes aisles of display structures and/or floor space for vegetables (veg) fruits, produce, etc.; area 203 includes aisles of display structures and/or floor space for promotional items; areas 204 and 205 includes aisles of display structures for staple foods; area 206 includes display structures positioned in aisles and along wall space for toiletries and pharmacy items; and area 207 includes point of sale (POS) devices such as cash registers, etc., that include aisles of display structures facing customers utilizing such POS devices.

Figure 3:
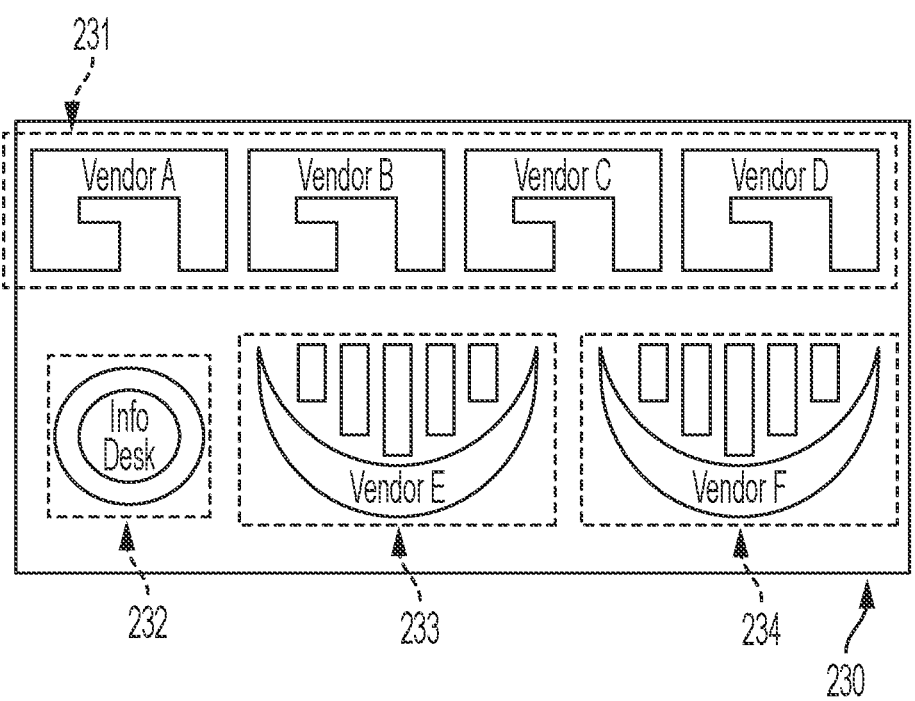

Referring briefly to FIG. 3, item 230 is an exemplary space layout for a trade show environment, manufacturer display area, product information center, etc. As can be seen in FIG. 3, the space layout 230 has various areas 231-234 that maintain display structures for different vendors to exhibit their products, advertising, etc. In this example, area 231 includes aisles of display structures and/or floor space for various vendors (Vendor A-Vendor D); area 232 includes a round display structure and/or floor space for an information desk/kiosk; and areas 233-234 include aisles of display structures and/or floor space for various vendors (Vendor E-Vendor F).

Figure 4:
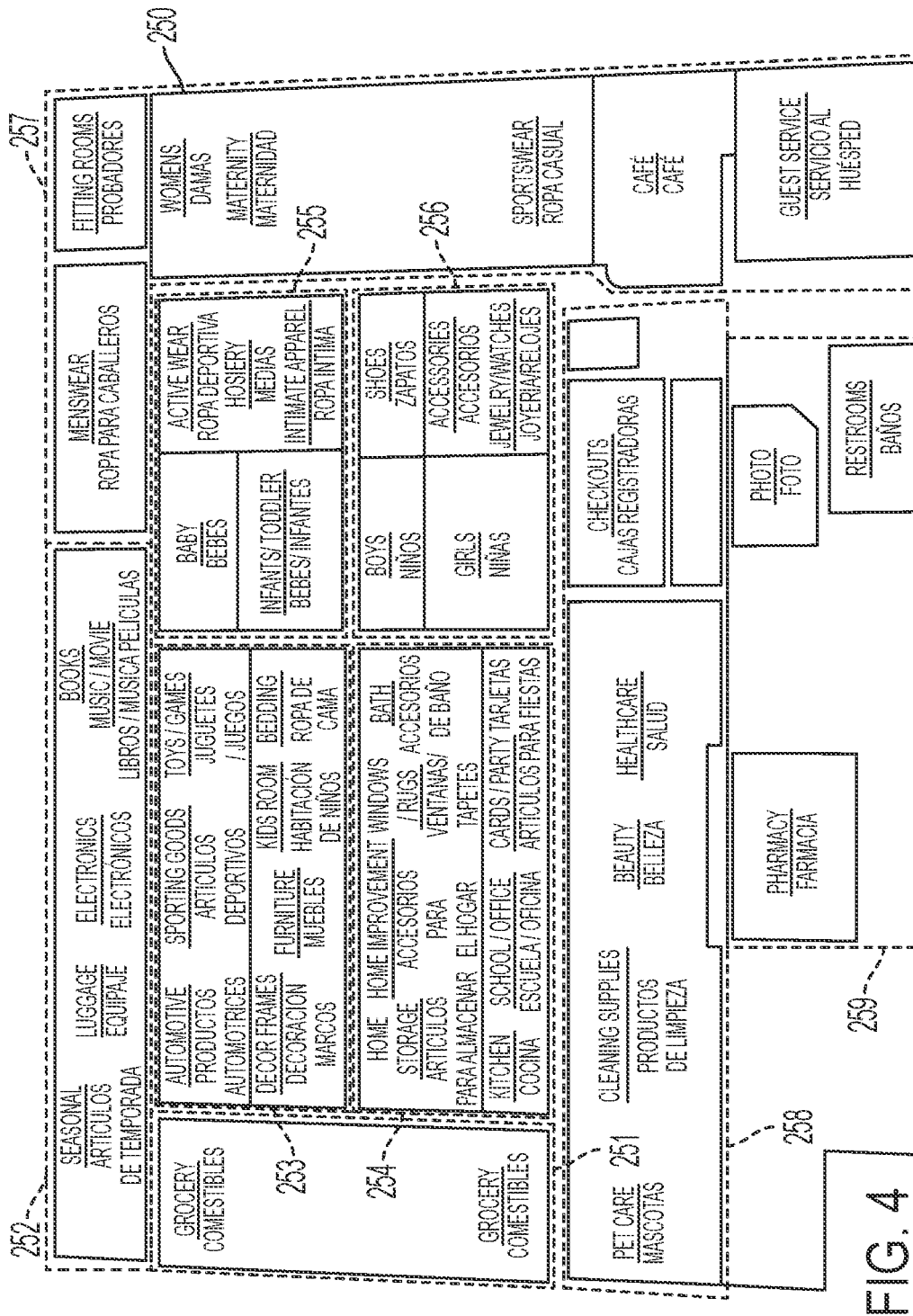
Figure 5:
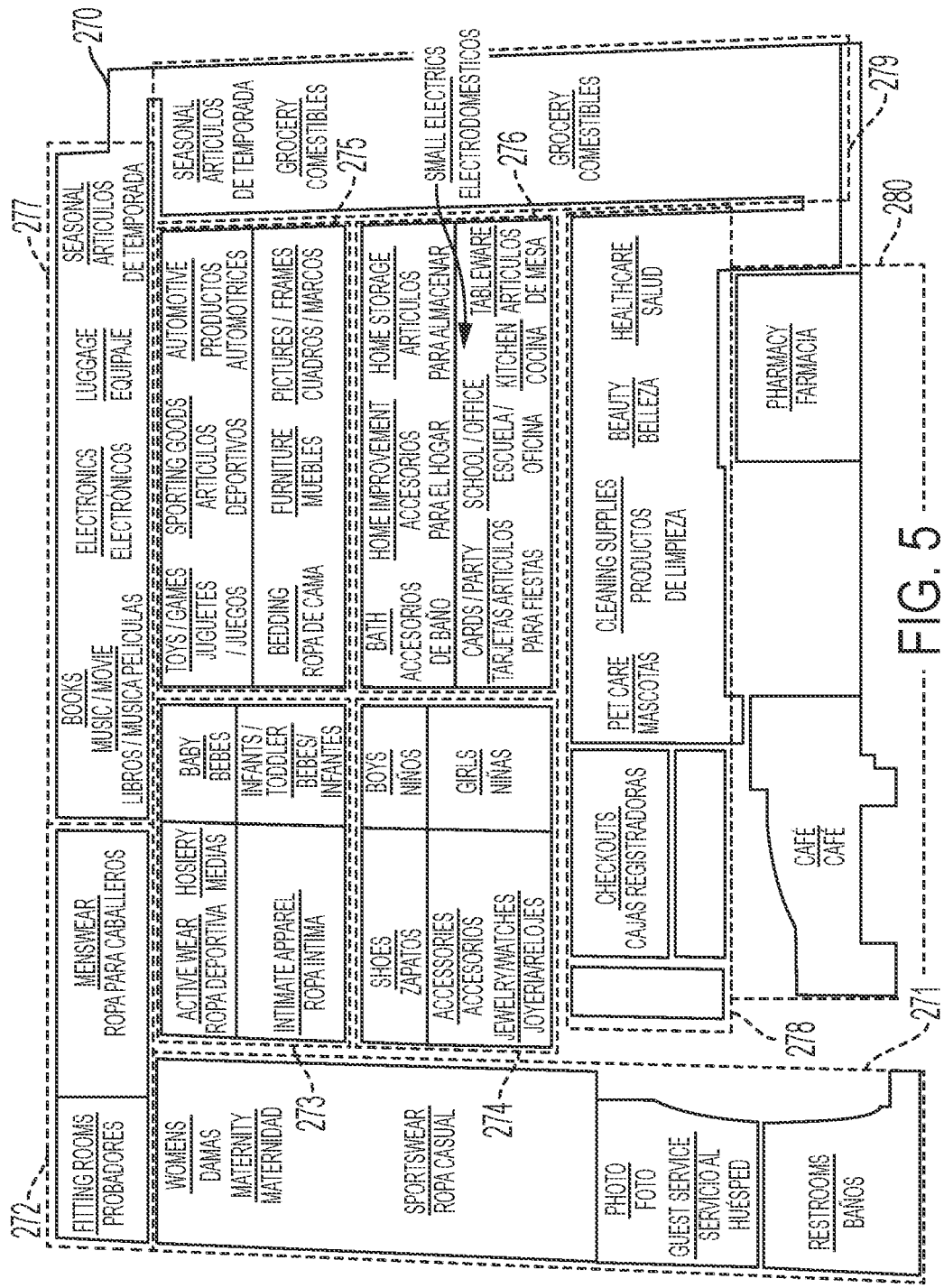

Referring briefly to FIGS. 4 and 5, items 250 and 270 are exemplary space layouts for a retail environment, warehouse, or similar physical structure. As can be seen in FIG. 4, the space layout 250 has various areas 251-259 and, as can be seen in FIG. 5, the space layout 270 has various areas 271-280 and such areas 251-259 and 271-280 maintain display structures (e.g., shelving, refrigeration/freezer units, assigned floor space, etc.) for different items. FIGS. 4 and 5 demonstrate that different space layouts can maintain display structures for the same or similar items however the spatial organization of those items within the various space layouts may be dramatically different.

FIGS. 2-5 show that the areas 201-205, 231-234, 251-259, and 271-280 are each generally a continuous, unbroken (sometimes irregular) geometric shape within the given space layout (200, 230, 250, 270). FIGS. 2-5 also show that the areas 201-205, 231-234, 251-259, and 271-280 generally do not overlap one another within the space layout and that each of the display structures is included within only one of the different areas.

The display structures are adapted to maintain display items by having shelves, racks, hooks, mounting points, etc., or other physical devices that are shaped and sized to hold and support the display items securely, yet in a manner that allows easy removal of the display items from the display structures and easy restocking (placement of the display items on to the display structures). The display structures can be highly decorative or can simply be basic shelving. Such display items can be, for example, merchandise that is for sale, stored/warehoused items, items undergoing processing, etc.

Referring again to FIG. 1, as shown in item 104, this processing obtains, again using the computer, item data related to the various display items within the space layout. The item data can include prices, descriptions, artwork, computer-readable codes, etc., of such merchandise for sale, stored/warehoused items, items undergoing processing, etc. The item data can be obtained, for example, from an item database 106. In other options, the item data can be manually entered into the computer system by a user through the various user interface devices or the user may supply a file to the computer that contains the item data.

Figure 7:
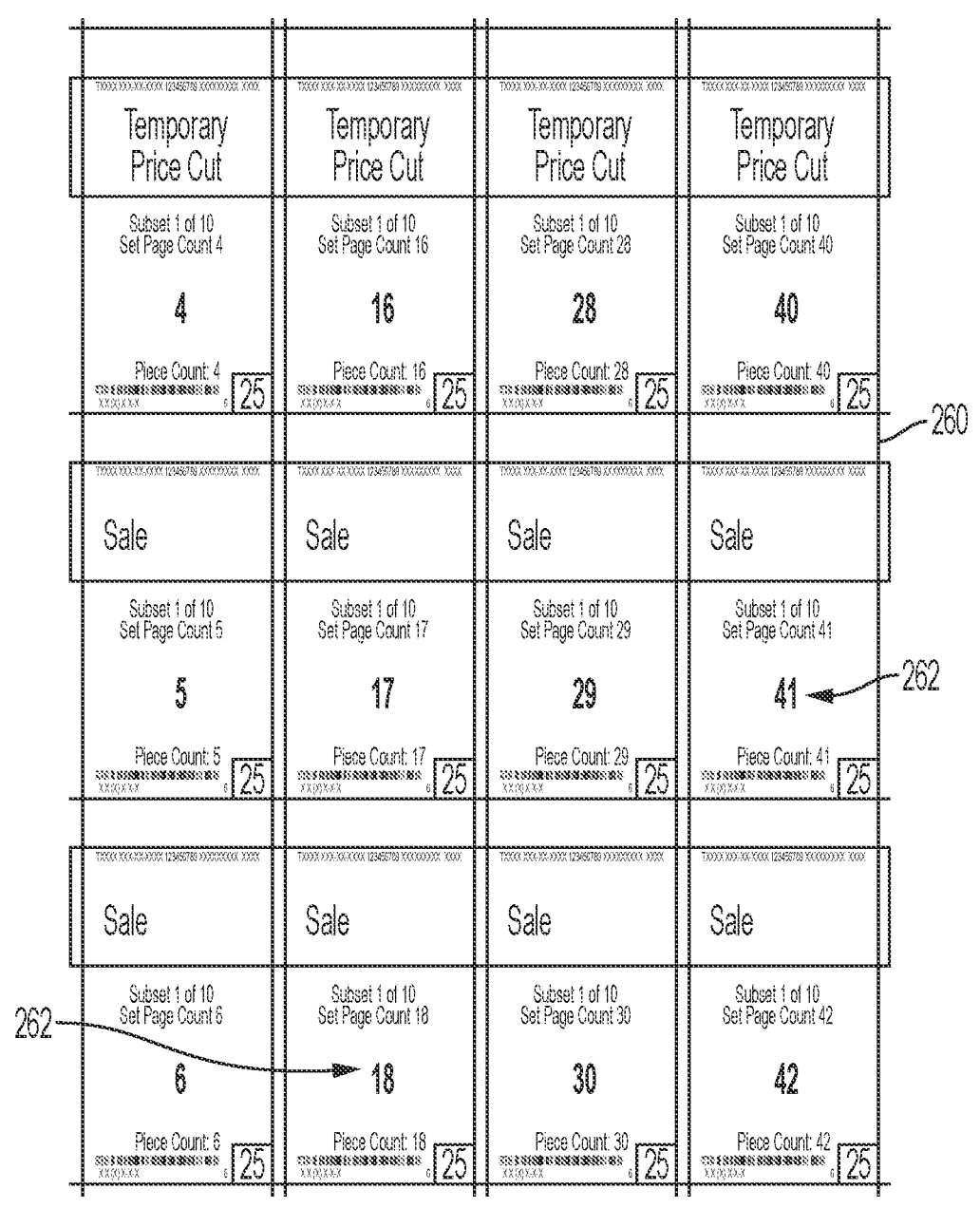

The item data maintained in the item database 106 is formatted to be printed on item signs that are adapted to be attached to the display structures in locations corresponding to the display items. FIG. 7 illustrates an exemplary sheet 260 on which 12 different signs 262 are printed. Each of the item signs 262 can be different from the other item signs 262 and each of the item signs 262 is usually specific to only one corresponding display item (of which the display structure can store a quantity). For example, each of the item signs 262 can include a different item description, item price, shelving location information, computer readable code, unit pricing information, artwork, etc., for a quantity of the same item stored directly adjacent the corresponding item sign on the display structure. Thus, for a food staple such as sugar, one unique item sign (that is different from all other signs in the retail location) corresponding to a specific brand and specific package size of sugar is attached to a shelf of a display structure where many packages of that brand/size sugar are stocked (stored/maintained) and the corresponding item sign is attached to the shelf directly adjacent where such sugar packages are stored. In some situations, multiple copies of the exact same sign 262 may be utilized in areas where large quantities of a specific display item are maintained on the display structures.

Further, as shown in item 108 in FIG. 1, the methods herein identify the areas within a given space layout. In some options, the space layout maintained in the layout database 102 can include areas that are identified. In other options, the user can manually identify the areas in item 108. Also, the systems herein can automatically create/define the areas for a space layout in item 108 using different rules (such as item categories, aisle length, space layout area, marketing specialty, item loading/unloading mechanical requirements, etc).

As shown in item 110 in FIG. 1, these methods determine, using the computer, for each of the areas, an area-specific number of item signs that need to be printed (which is based on the information of the display items in each of the areas) in the next upcoming printing operations (item 122, discussed below). For example, the processing in item 110 determines how many item signs are to be attached to each of the different display structures within a given area to identify the number of item signs that need to be printed for that area. This can be less than the total number of item signs that are attached to the display structures because some item signs can be replaced frequently (e.g., periodically, such as weekly, monthly, etc.) while other item signs may be replaced at lower frequencies or never replaced. Therefore, it may be common to replace a relatively small percentage (e.g., 10%, 25%, etc.) per week, per month, etc., of the total number of item signs that are attached to the display structures. In any case, the processing shown in item 110 counts the actual number of item signs that will be printed during the next upcoming printing operation (per area).

Additionally, as shown in item 112 in FIG. 1, such methods obtain, using the computer, bundle rules. As detailed below, the signs are printed (122), bundled (126), and wrapped and packaged for shipping (128), and the bundle rules define how the item signs are to be aggregated into bundles. The bundle rules can be obtained, for example, from a bundle rules database 114. In other options, the bundle rules can be manually entered into the computer system by a user through the various user interface devices or the user may supply a file to the computer that contains the bundle rules.

In some examples, the bundle rules can include size limits for sign bundles (based upon packaging limitations), sequential order constraints for individual printed signs within the sign bundles (to allow the item signs to be unloaded in an order that makes item sign placement on the display structures efficient from an employee resource standpoint), the size of the print media, the number of the item signs to be printed on each of the sheets of the print media (from a sign handling machinery optimization standpoint), etc. The display structures are often arranged in aisles and the bundle rules can include signs for multiple aisles in each bundle, with signs in sequential order within each bundle to allow an employee installing signs to proceed down one aisle and back up an immediately adjacent aisle, etc. In other examples, the bundle rules can also avoid including a partial aisle in a sign bundle so that, where possible, full aisles can be served by a bundle.

As shown in item 116 in FIG. 1, this allows these methods to organize, using the computer, the item signs into the sign bundles according to the number of item signs to be printed for each area (determined in item 110) and the bundle rules (obtained in item 112). Depending upon the number of signs in each area, the organization process in item 116 may end up creating multiple bundles in an area. However, even if multiple bundles are created for some of the areas, each of the bundles might include signs from a single area or across multiple areas that are adjacent or have some relation to or provide opportunity to optimize sign bundles. Therefore, each of the bundles could include signs from different areas or only a single area. Each bundle can be unique to a single area and be associated with only one of the areas (e.g., each bundle can be unique to, or dedicated to, a single area) or a bundle could span multiple areas. The organization process in item 116 can be merely a single pass through each of the different areas, where bundles begin at the beginning of one corner of an area and the bundles are ended when the last full aisle is reached before exceeding a maximum bundle size, after which allocation of subsequent signs to the next bundle can begin. Additional bundles can be created until all signs in a given area are assigned to a bundle.

However, the organization process in item 116 can be substantially more complex and can perform multiple passes through each area to determine the optimal allocation of different item signs to different bundles. This processing can include, for example, Monte Carlo analysis processing, neural network (artificial intelligence) processing, other optimization routines, or any similar complex multi-pass optimization methodology.

In some options herein, the methods adjust, using the computer, the sizes of the areas within the space layout, the number of signs printed per sheet, the sheet size, etc., to further optimize the number of signs in each of the sign bundles. The process of adjusting the areas within the space layout, signs per sheet, sheet size, etc., can be based on user feedback and/or area adjustment rules. Thus, such processing can repeat, using the computer, the organizing of the item signs into the sign bundles after adjusting the areas.

This is shown in FIG. 1 in the feedback loop from item 116. Specifically, processing flows from 116 back to item 118 where the initial item sign assignment to different bundles output by the processing in item 116 is presented to a user for feedback (e.g., presented on the user interface of the computer system). Additionally, whether feedback (118) is provided or not, the flow then proceeds to item 120 where such processing revises/adjusts the areas automatically based upon various area adjustment rules.

Such area adjustment rules may consider employee resources such as employee time, employee training level, possibilities of error/confusion in sign placement, etc. These area adjustment rules can, for example, attempt to avoid having employees with different abilities performing sign placement in inappropriate areas. For example, the adjustment rules can avoid having an individual from lawn and garden (who may be talented in loading pallets of bulk materials on industrial shelving) from placing signs within delicate, highly specialized shelving such as cosmetics or pharmacy items. The adjustment rules can also consider staffing issues where excess staff may be available in one department, while another department may lack sufficient staff (which would allow the excess-staffed department's area to be increased in size). Additionally, the adjustment rules may change the "N" number of the N-up printing to change the number of signs that are printed per sheet to a number that reduces the number of blank signs on each sheet. The number of signs per sheet can be changed to reduce the number of blank signs produced for a given area, or to reduce the overall aggregate number of blank signs produced for all areas within a location. In one example, the sheet size can remain the same, but the size of the signs can be changed to permit the number of signs per sheet to be changed. Conversely, the sheet size can be changed, and the size of the signs can remain the same to permit the number of signs per sheet to be changed (or both sheet size and sign size can be changed). Many other area adjustment rules can be utilized, and the foregoing are merely some limited examples.

Figure 6:
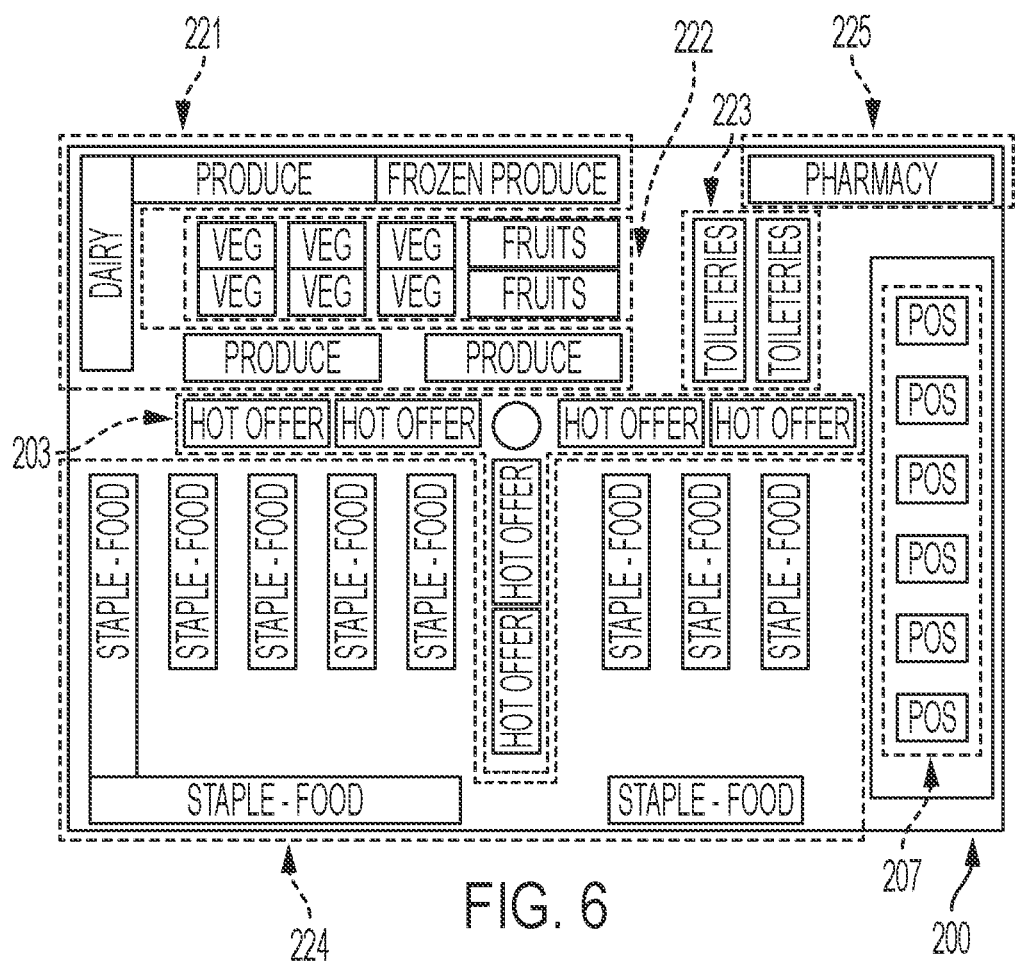
Figure 8:
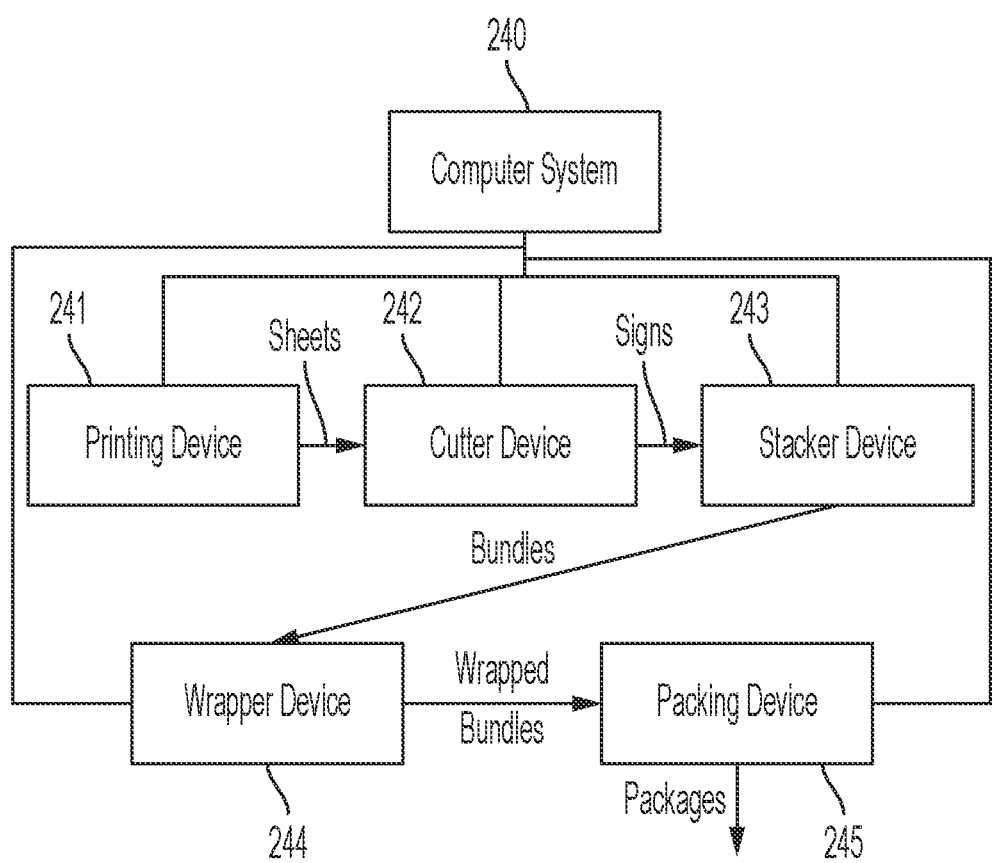
FIGS. 8-9 are conceptual schematic diagrams illustrating systems herein.

The difference between FIG. 1 and FIG. 6 illustrates how different areas can be adjusted in the feedback loop (items 116, 118, 120, 108, 110, 112). The space layout 200 is the same in FIGS. 1 and 6; however, areas 221-225 in FIG. 6 are changed relative to the areas shown in FIG. 1. Specifically, the allocation of aisles in areas 201-202 has been changed in areas 221, 222; area 206 has been divided into two areas, 223 and 225; and areas 204 and 205 have been combined into area 224. This feedback process can be repeated until optimization criteria are satisfied.

Once the bundles are established, as shown in item 122 these methods print, using a printer device that is controlled by the computer, the item signs. As discussed in greater detail below, this printing involves printing marking material (ink, toner, etc.) on print media (e.g., thick paper stock, plastic, etc.). In such processing, multiple item signs are printed on each sheet of print media in N-up processing. In one example, FIG. 7 illustrates an exemplary sheet 260 on which 12 different signs 262 are printed. Such printing is commonly referred to as N-up printing, where the example shown in FIG. 7 is an example of 12-up printing.

One issue with N-up printing is that, at the end of a bundle, there may be a number of unused locations on the sheet 260 where no printing occurs (blank signs). This issue is amplified in systems that limit bundles to one bundle per aisle because (unless the number of signs in that aisle is exactly divisible by the N number (12 in this example)) there are regularly unused locations on the last printed sheet for each bundle and this can generate a large amount of waste. The systems and methods herein avoid this situation by utilizing areas for bundles instead of aisles. With the systems and methods herein multiple aisles can be included in each of the bundles, allowing an individual printed sheet 262 to include signs from different aisles. This reduces the number of unused locations (blanks) on the sheet 260, which in turn reduces the number of sheets 260 that are utilized, reduces waste, and reduces the number of blanks that employees placing the item signs have to accumulate and discard.

Also, such processing in item 122 can print a top label or labels mid-bundle. The top label can identify all signs or aisles that are within the entire following bundle. Mid-bundle labels can be used to identify the subsequent printed signs in a bundle. In other words, a mid-bundle label can be used to identify the signs that occur next in the bundle until the next mid-bundle label. In one example, a label can be added sequentially within a bundle at the beginning of each new aisle, each new department, or other indicator of location difference. Such labels can assist employees by informing them that the location for the next sequence of item signs is in a different location.

As shown in item 124, this processing can also cut, using a cutter device controlled by the computer, the print media into individual printed signs. Item 126 shows that such processing can stack, using a stacker device controlled by the computer, the printed signs into the sign bundles. In item 128, this processing wraps, using a wrapper device controlled by the computer, the sign bundles and manually or automatically loads the wrapped sign bundles into shipping containers (e.g., carboard boxes).

Various systems herein include at least one computer or computer system 240 that is adapted to obtain a space layout having areas. The areas are each a continuous, unbroken geometric shape within the space layout. The areas generally do not overlap one another within the space layout. The display structures are adapted to maintain display items. Such display items can be, for example, merchandise that is for sale and the item data can include prices for, and descriptions of, such merchandise for sale. The computer 240 is adapted to obtain item data related to the display items. The item data is formatted to be printed on item signs adapted to be attached to the display structures in locations corresponding to the display items. Each of the item signs is different from the other item signs and each of the item signs is specific to the corresponding display items.

The computer 240 is also adapted to determine, for each of the areas, an area-specific number of item signs to be printed based on the display items in each of the areas. Additionally, the computer 240 is adapted to obtain bundle rules. In some examples, the bundle rules can include size limits for sign bundles, sequential order constraints for individual printed signs within the sign bundles, the size of the print media, the number of the item signs to be printed on each of the sheets of the print media, etc. The display structures are often arranged in aisles and the bundle rules can include signs for multiple aisles in each bundle. Also, the bundle rules can also avoid including a partial aisle in a sign bundle.

Further, the computer 240 is adapted to organize the item signs into the sign bundles according to the bundle rules. Additionally, the computer 240 is adapted to adjust the sizes of the areas within the space layout to optimize the number of signs in each of the sign bundles. The computer 240 also is adapted to repeat the processes of organizing the item signs into the sign bundles after adjusting the areas.

These systems also include at least one printer device 241 that is controlled by the computer 240. Details of printers are discussed below. The printer device 241 is adapted to print the item signs and labels identifying subsequent printed signs in a bundle. Multiple item signs are printed on each sheet of print media.

Such systems also include a cutter device 242 that is controlled by the computer 240. Cutter devices 242 can use lasers, knives, blades, etc., and are precisely computer controlled devices that separate sheets of material into pieces (e.g., signs, etc.) The cutter device 242 is adapted to cut the print media into individual printed signs. These systems additionally include a stacker device 243 that is controlled by the computer 240. Stacker devices 243 can include robotic arms, guide systems, feeding devices, etc., that can stack and align items that a fed into the stacker devices. The stacker device 243 is adapted to stack the printed signs into the sign bundles. The systems herein also include a wrapper device 244 that is controlled by the computer 240. Wrapper devices 244 receive stacked items and use contact mechanisms to wrap a material (bands, plastic sheets, etc.) around the stacked items to maintain the stacked items in a stack and to protect the stacked items from external environments. The wrapper device 244 is adapted to wrap the sign bundles. The systems herein also include a packing device 245 that is controlled by the computer 240. Packaging devices 245 use robotic arms, guide systems, feeding devices, etc., to assemble or retrieve containers (e.g., carboard boxes), direct stacked items into the containers, seal the containers, and potentially apply labels to the containers. The packing device 245 is adapted to pack the sign bundles in packages.

Figure 9:
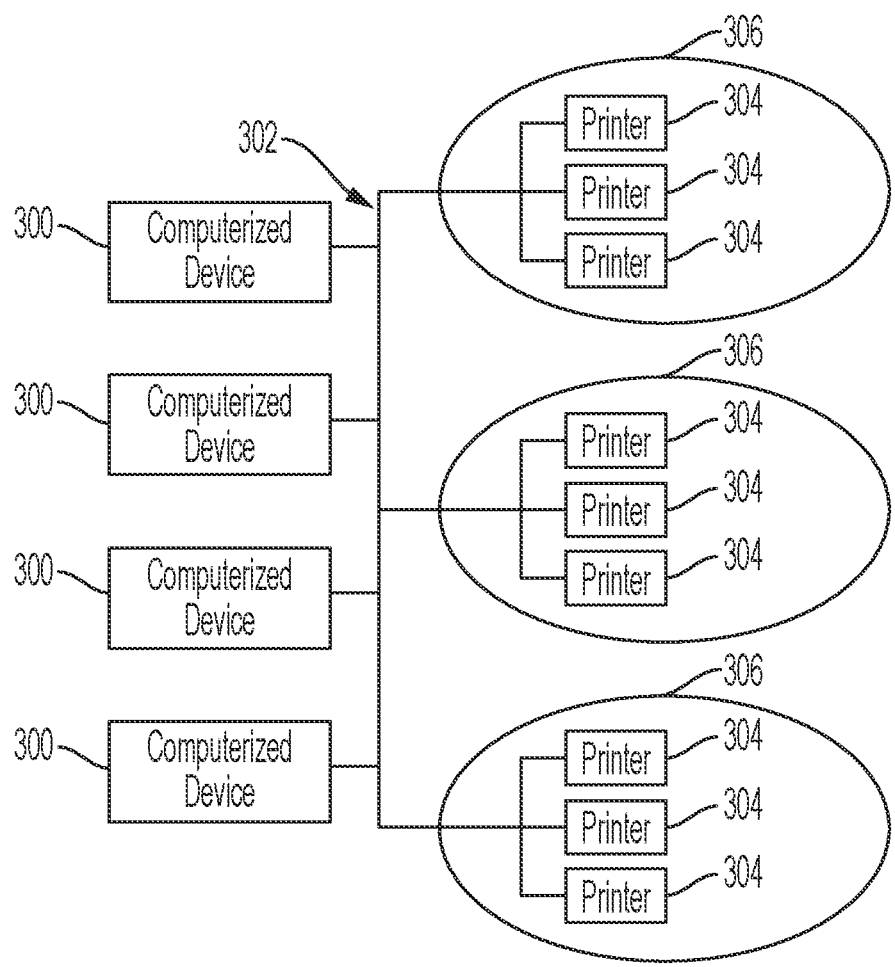

As shown in FIG. 9, exemplary systems and methods herein include various computerized devices 300, 304 located at various different physical locations 306. The computerized devices 300, 304 can include print servers, printing devices, personal computers, the computer 240 discussed above, etc., and are in communication (operatively connected to one another) by way of a local or wide area (wired or wireless) network 302.

Figure 10:
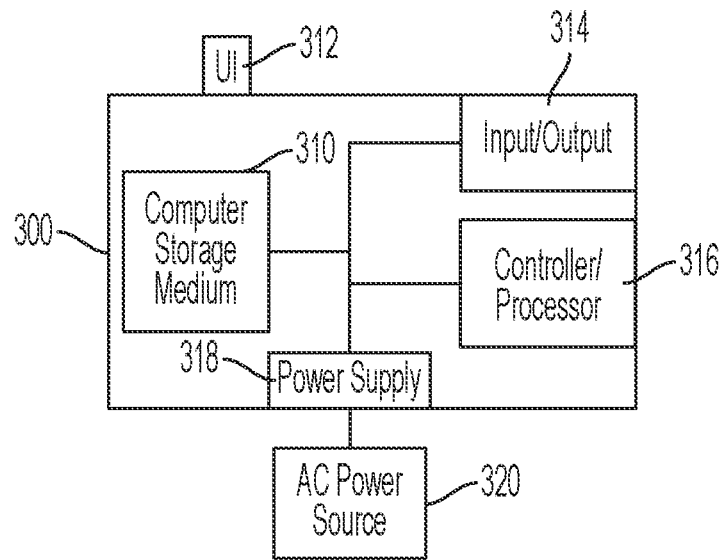
FIG. 10 is a conceptual schematic diagram illustrating devices herein.

FIG. 10 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312.

The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 10, a body housing has one or more functional components that operate on power supplied from an alternating current (AC) source 320 by the power supply 318. The power supply 318 can comprise a common power conversion unit, power storage element (e.g., a battery, etc), etc.

Figure 11:
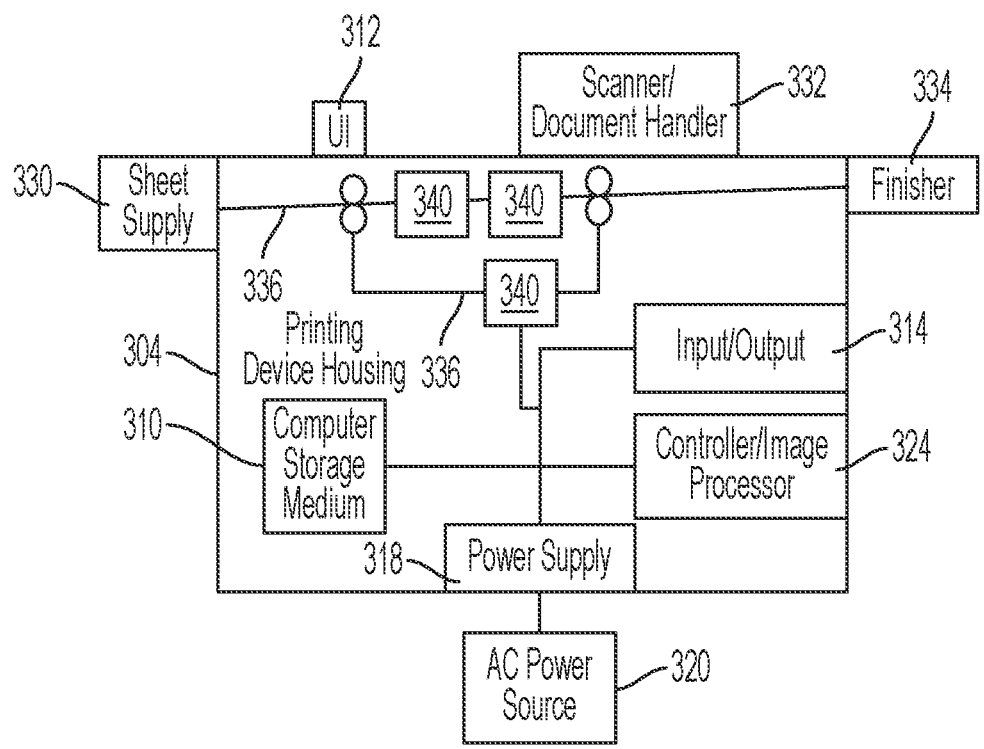
FIG. 11 is a conceptual schematic diagram illustrating devices herein.

FIG. 11 illustrates a computerized device that is a printing device 304, which can be used with systems and methods herein (such as printing device 241) and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

Figure 12:
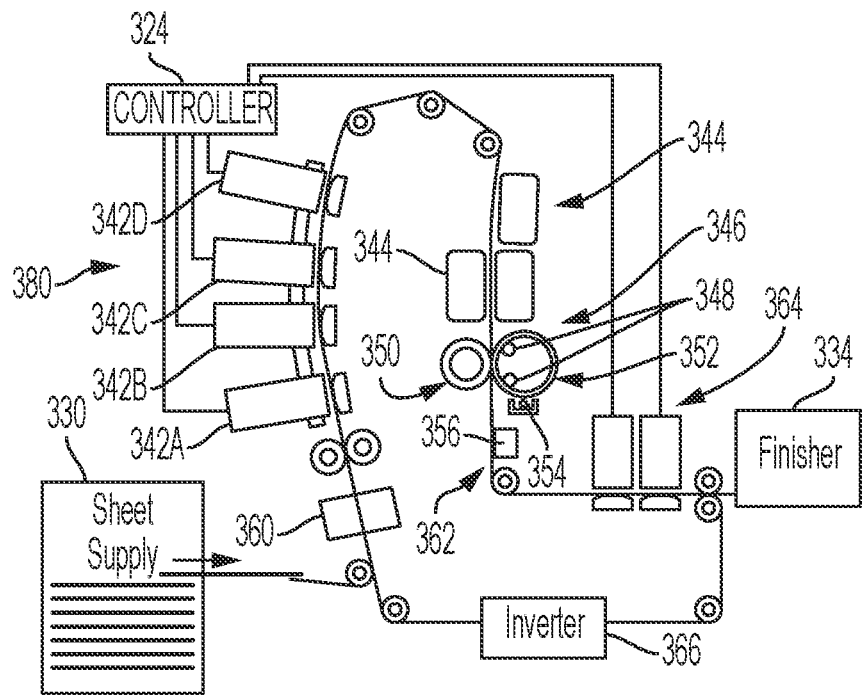
FIG. 12 is a conceptual schematic diagram illustrating devices herein.
Figure 13:
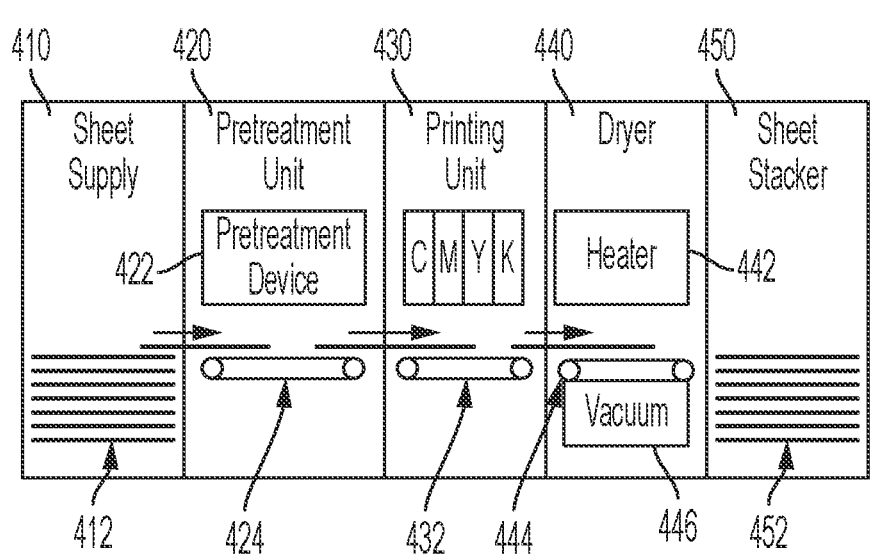
FIG. 13 is a conceptual schematic diagram illustrating devices herein.

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 12, or a high-speed aqueous imaging system, as shown in FIG. 13.

More specifically, FIG. 12 illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material), a media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 13 illustrates an inkjet or aqueous ink printer system 400 that is one of the printers 304, discussed above. Specifically, FIG. 13 illustrates a high-speed ink jet or aqueous ink image producing machine or printer 400. The printer 400 includes a media supply 410, a pretreatment unit 420, a printing unit 430, a dryer 440, and a sheet stacker device 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 13) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 13 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker device 450 receives and stacks the printed sheets 452.

While FIGS. 12 and 13 illustrate four marking stations adjacent or in contact with a rotating belt, which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    obtaining, by a computer, a space layout having areas, wherein the areas maintain display structures, and wherein the display structures are adapted to maintain display items;
    obtaining, by the computer, item data related to the display items, wherein the item data is formatted to be printed on item signs adapted to be attached to the display structures in locations corresponding to the display items, and wherein each of the item signs is different from other item signs and each of the item signs is specific to corresponding display items;
    determining, by the computer, for each of the areas, an area-specific number of item signs to be printed based on the display items in each of the areas;
    obtaining, by the computer, bundle rules;
    organizing, by the computer, the item signs into sign bundles according to the bundle rules; and adjusting, by the computer, sizes of the areas within the space layout to optimize a number of signs in each of the sign bundles,
    wherein the display structures are arranged in aisles, wherein the bundle rules include the item signs for multiple aisles in each bundle, and wherein the bundle rules avoid including a partial aisle in a sign bundle.

2. The method according to claim 1, further comprising adjusting, by the computer, the areas within the space layout based on user feedback.

3. The method according to claim 1, wherein the bundle rules comprise:
    size limits for the sign bundles;
    sequential order constraints for printed signs within the sign bundles;
    a size of print media; and
    a number of the item signs to be printed on each sheet of print media.

4. The method according to claim 1, wherein the areas are each a continuous, unbroken geometric shape within the space layout, and wherein the areas do not overlap one another within the space layout.

5. The method according to claim 1, further comprising creating labels identifying subsequent printed signs in a bundle.

6. The method according to claim 1, wherein the display items comprise merchandise for sale and the item data comprise prices for, and descriptions of, the merchandise for sale.

7. A method comprising:
    obtaining, by a computer, a space layout having areas, wherein the areas maintain display structures, and wherein the display structures are adapted to maintain display items;
    obtaining, by the computer, item data related to the display items, wherein the item data is formatted to be printed on item signs adapted to be attached to the display structures in locations corresponding to the display items, and wherein each of the item signs is different from other item signs and each of the item signs is specific to corresponding display items;
    determining, by the computer, for each of the areas, an area-specific number of item signs to be printed based on the display items in each of the areas;
    obtaining, by the computer, bundle rules;
    organizing, by the computer, the item signs into sign bundles according to the bundle rules;
    adjusting, by the computer, sizes of the areas within the space layout to optimize a number of signs in each of the sign bundles;
    repeating, by the computer, the organizing of the item signs into the sign bundles after the adjusting of the areas;
    printing, by a printer device controlled by the computer, the item signs, wherein multiple ones of the item signs are printed on each sheet of print media;
    cutting, by a cutter device controlled by the computer, the print media into individual printed signs;
    stacking, by a stacker device controlled by the computer, the printed signs into the sign bundles; and
    wrapping, by a wrapper device controlled by the computer, the sign bundles.

8. The method according to claim 7, wherein the adjusting, by the computer, the sizes of the areas within the space layout is based on user feedback.

9. The method according to claim 7, wherein the bundle rules comprise:
   size limits for the sign bundles;
   sequential order constraints for the printed signs within the sign bundles;
   a size of the print media; and
   a number of the item signs to be printed on each sheet of the print media.

10. The method according to claim 7, wherein the display structures are arranged in aisles, wherein the bundle rules include the item signs for multiple aisles in each bundle, and wherein the bundle rules avoid including a partial aisle in a sign bundle.

11. The method according to claim 7, wherein the areas are each a continuous, unbroken geometric shape within the space layout, and wherein the areas do not overlap one another within the space layout.

12. The method according to claim 7, wherein the printing further comprises printing labels identifying subsequent printed signs in a bundle.

13. The method according to claim 7, wherein the display items comprise merchandise for sale and the item data comprise prices for, and descriptions of, the merchandise for sale.

14. A system comprising:
   a computer adapted to:
      obtain a space layout having areas, wherein the areas maintain display structures, and wherein the display structures are adapted to maintain display items;
      obtain item data related to the display items, wherein the item data is formatted to be printed on item signs adapted to be attached to the display structures in locations corresponding to the display items, and wherein each of the item signs is different from other item signs and each of the item signs is specific to corresponding display items;
      determine for each of the areas, an area-specific number of item signs to be printed based on the display items in each of the areas;
      obtain bundle rules;
      organize the item signs into sign bundles according to the bundle rules; and
      adjust sizes of the areas within the space layout to optimize a number of signs in each of the sign bundles, wherein the display structures are arranged in aisles, wherein the bundle rules include the item signs for multiple aisles in each bundle, and wherein the bundle rules avoid including a partial aisle in a sign bundle.

15. The system according to claim 14, further comprising adjusting, by the computer, the areas within the space layout based on user feedback.

16. The system according to claim 14, wherein the bundle rules comprise:
   size limits for the sign bundles;
   sequential order constraints for printed signs within the sign bundles;
   a size of print media; and
   a number of the item signs to be printed on each sheet of the print media.

17. The system according to claim 14, wherein the areas are each a continuous, unbroken geometric shape within the space layout, and wherein the areas do not overlap one another within the space layout.

18. The system according to claim 14, wherein the display items comprise merchandise for sale and the item data comprise prices for, and descriptions of, the merchandise for sale.

* * * * *